US010719408B2

(12) United States Patent
Rodrigues et al.

(10) Patent No.: US 10,719,408 B2
(45) Date of Patent: *Jul. 21, 2020

(54) RETAIN LOCALLY DELETED CONTENT AT STORAGE SERVICE

(71) Applicant: MICROSOFT TECHNOLOGY LICENSING, LLC, Redmond, WA (US)

(72) Inventors: John Rodrigues, Woodinville, WA (US); Steven Bailey, Bellevue, WA (US); Adam Czeisler, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 135 days.

This patent is subject to a terminal disclaimer.

(21) Appl. No.: 15/226,966

(22) Filed: Aug. 3, 2016

(65) Prior Publication Data

US 2018/0039551 A1  Feb. 8, 2018

(51) Int. Cl.
*G06F 11/14* (2006.01)
*G06F 16/27* (2019.01)
(Continued)

(52) U.S. Cl.
CPC ...... *G06F 11/1464* (2013.01); *G06F 9/44505* (2013.01); *G06F 16/122* (2019.01);
(Continued)

(58) Field of Classification Search
USPC .......................................................... 707/656
See application file for complete search history.

(56) References Cited

U.S. PATENT DOCUMENTS 6,336,175 B1   1/2002 Shaath et al.
7,143,092 B1  11/2006 Gregorat
(Continued)

FOREIGN PATENT DOCUMENTS

CN    105072135 A   11/2015
WO    2006114723 A2  11/2006

OTHER PUBLICATIONS

Riva et al. (Policy Expressivity in the Anzere Personal Cloud, SOCC'11, Oct. 27-28, 2011, Cascais, Portugal).*
(Continued)

*Primary Examiner* — Muluemebet Gurmu
(74) *Attorney, Agent, or Firm* — Michael Best & Friedrich LLP

(57) ABSTRACT

Cloud-based storage services are provided for storing and/or sharing content across multiple devices, where the content is periodically synchronized between the devices and the storage service. Conventionally, if locally stored content is deleted from a device, the delete would be propagated to the storage service causing the content to not only be deleted from the storage service but from any other devices where the content was locally stored and synchronized with the storage service. Embodiments are directed to retainment of locally deleted content at the storage service to prevent accidental or nefarious deletions of locally stored content on a device from further causing the content to be deleted universally from the storage service and/or multiple other devices. For example, the storage service may be configured to receive content stored locally on the device, detect a deletion of the content on the device, and retain the content at the storage service.

13 Claims, 11 Drawing Sheets

(51) Int. Cl.
| | |
|---|---|
| *H04L 29/08* | (2006.01) |
| *G06F 9/445* | (2018.01) |
| *G06F 16/11* | (2019.01) |
| *G06F 16/16* | (2019.01) |
| *G06F 16/23* | (2019.01) |
| *G06F 16/188* | (2019.01) |
| *G06F 16/178* | (2019.01) |
| *G06F 16/182* | (2019.01) |

(52) U.S. Cl.
CPC .......... *G06F 16/162* (2019.01); *G06F 16/178* (2019.01); *G06F 16/182* (2019.01); *G06F 16/188* (2019.01); *G06F 16/1844* (2019.01); *G06F 16/2329* (2019.01); *G06F 16/27* (2019.01); *G06F 16/275* (2019.01); *H04L 67/1095* (2013.01); *H04L 67/1097* (2013.01); *G06F 2201/805* (2013.01)

(56) References Cited

U.S. PATENT DOCUMENTS

| | | | |
|---|---|---|---|
| 7,231,598 B1 * | 6/2007 | Sawicki | G06F 17/2247 707/999.01 |
| 7,363,330 B1 | 4/2008 | Ellman et al. | |
| 7,962,950 B2 | 6/2011 | Choo et al. | |
| 8,453,215 B1 | 5/2013 | LeBert | |
| 8,504,532 B2 | 8/2013 | Saxena et al. | |
| 8,819,208 B2 | 8/2014 | Wright | |
| 8,856,256 B1 | 10/2014 | Srinivasan | |
| 8,918,863 B1 | 12/2014 | Pendse | |
| 9,037,825 B1 | 5/2015 | Donlan et al. | |
| 9,292,687 B2 | 3/2016 | Thure et al. | |
| 9,912,752 B1 | 3/2018 | Davis et al. | |
| 2002/0194177 A1 | 12/2002 | Sherman et al. | |
| 2004/0068523 A1 | 4/2004 | Keith et al. | |
| 2004/0186858 A1 | 9/2004 | Mcgovern et al. | |
| 2005/0114412 A1 | 5/2005 | Gerhard | |
| 2006/0200623 A1 | 9/2006 | Gonzalez et al. | |
| 2007/0044020 A1 * | 2/2007 | Iwatsu et al. | G06F 21/316 715/700 |
| 2007/0070218 A1 * | 3/2007 | Meijer | G06F 17/30244 348/231.99 |
| 2008/0091944 A1 | 4/2008 | Von Mueller et al. | |
| 2008/0228578 A1 * | 9/2008 | Mashinsky | G06F 21/10 705/14.54 |
| 2010/0030819 A1 | 2/2010 | Srinivasan et al. | |
| 2010/0197383 A1 | 8/2010 | Rader et al. | |
| 2010/0312944 A1 | 12/2010 | Walker | |
| 2011/0007076 A1 | 1/2011 | Nielsen et al. | |
| 2013/0074193 A1 | 3/2013 | Baker | |
| 2013/0144845 A1 | 6/2013 | Ghuge et al. | |
| 2013/0151658 A1 | 6/2013 | Baker et al. | |
| 2013/0198521 A1 | 8/2013 | Wu | |
| 2013/0244423 A1 | 9/2013 | Kolics | |
| 2014/0019497 A1 | 1/2014 | Cidon et al. | |
| 2014/0082749 A1 | 3/2014 | Holland et al. | |
| 2014/0095727 A1 * | 4/2014 | Evans et al. | H04L 29/06 709/230 |
| 2014/0172799 A1 | 6/2014 | Dorman | |
| 2014/0181057 A1 | 6/2014 | Euresti et al. | |
| 2014/0188808 A1 | 7/2014 | Wolf et al. | |
| 2014/0258350 A1 | 9/2014 | Duval et al. | |
| 2014/0279498 A1 | 9/2014 | Qaim-maqami et al. | |
| 2014/0310769 A1 | 10/2014 | O'neill et al. | |
| 2014/0337291 A1 | 11/2014 | Dorman et al. | |
| 2014/0359085 A1 | 12/2014 | Chen | |
| 2014/0372382 A1 | 12/2014 | Hrebicek et al. | |
| 2015/0234612 A1 | 8/2015 | Himelstein et al. | |
| 2015/0248631 A1 | 9/2015 | Brown | |
| 2015/0312422 A1 | 10/2015 | Leemet et al. | |
| 2015/0347552 A1 | 12/2015 | Habouzit et al. | |
| 2016/0004882 A1 | 1/2016 | Ballai et al. | |
| 2016/0019233 A1 | 1/2016 | Wijayaratne et al. | |
| 2016/0026455 A1 | 1/2016 | Jeffrey et al. | |
| 2016/0041972 A1 | 2/2016 | Lehmann et al. | |
| 2016/0162374 A1 | 6/2016 | Mutha et al. | |
| 2016/0267404 A1 | 9/2016 | Shicoff et al. | |
| 2016/0380937 A1 * | 12/2016 | Murphy | H04L 51/08 709/206 |
| 2017/0063906 A1 | 3/2017 | Muddu et al. | |
| 2017/0228675 A1 | 8/2017 | Kisin et al. | |
| 2018/0039653 A1 | 2/2018 | Bailey et al. | |
| 2018/0039654 A1 | 2/2018 | Rodrigues et al. | |
| 2018/0054432 A1 | 2/2018 | Bailey et al. | |
| 2019/0258605 A1 | 8/2019 | Ballai et al. | |

OTHER PUBLICATIONS

Klein, Matt, "How to Save Drive Space by Offloading Local Files to the Cloud", Published on: Oct. 20, 2014 Available at: http://www.howtogeek.com/199099/save-drive-space-by-offloading-local-files-to-the-cloud/.

Han, et al., "MetaSync: Coordinating Storage across Multiple File Synchronization Services", In Journal of IEEE Internet Computing, vol. 20, Issue 3, May 1, 2016, pp. 36-44.

"International Search Report and Written Opinion Issued in PCT Application No. PCT/US2017/043821", dated Nov. 8, 2017, 15 Pages.

Ramasubramanian, et al., "Cimbiosys: A Platform for Content-based Partial Replication", In Proceedings of the 6th USENIX symposium on Networked systems design and implementation, Apr. 2, 2009, pp. 261-276.

Riva, et al., "Policy Expressivity in the Anzere Personal Cloud", In Proceedings of the 2nd ACM Symposium on Cloud Computing, Oct. 26, 2011, 14 Pages.

"Biba Model—Wikipedia, the Free Encyclopedia", Retrieved from: https://en.wikipedia.org/wiki/Biba_Model, Jul. 2, 2017, 3 Pages.

"Bulk delete", Retrieved from: https://help.podio.com/hc/en-us/articles/201019808-Bulk-delete, Jun. 2, 2016, 1 Page.

"Bulk Deleting Per-Job Screening Questions", Retrieved from: https://icare-test.icims.com/icimscustomer2/s/article/Bulk-Deleting-Per-Job-Screening-Questions, Jun. 2, 2016, 2 Pages.

"Create Files and Folder but prevent Deletion and Modification", Retrieved from http://superuser.com/questions/745923/ntfs-permissions-create-files-and-folder-but-prevent-deletion-and-modification, May 9, 2014, 2 Pages.

"The Ideal Dropbox Setup for External Hard Drives", Retrieved from: https://approductive.wordpress.com/2015/02/23/the-ideal-dropbox-setup-for-external-hard-drives/, Feb. 23, 2015, 32 Pages.

"Non-Final Office Action Issued in U.S. Appl. No. 15/241,116", dated Apr. 19, 2018, 23 Pages.

Blessings, Candace, "Cannot delete "all" messages . . . keep getting a Bulk Delete message", Retrieved from: https://productforums.google.com/forum/#!topic/gmail/rcMcG9PNPql, Mar. 5, 2016, 1 Page.

Callahan, Jane, "12 Advanced Dropbox Features That You Should Start Using", Retrieved from https://zapier.com/blog/dropbox-hidden-features/, Jun. 23, 2015, 17 Pages.

Chris, Hoffman, "How to Never Lose Files Stored in Dropbox and Other File-Syncing Services", Retrieved from: https://www.howtogeek.com/219299/ensure-youll-never-lose-files-stored-in-dropbox-and-other-file-syncing-services/, Jun. 13, 2015, 5 Pages.

Dewolf, John, "5 Tips to Secure Google Drive", Retrieved from: https://www.backupify.com/blog/5-tips-to-secure-google-drive, Aug. 4, 2012, 6 Pages.

"International Search Report and Written Opinion Issued in PCT Application No. PCT/US2017/044273", dated Sep. 27, 2017, 12 Pages.

"International Search Report and Written Opinion Issued in PCT Application No. PCT/US2017/046182", dated Oct. 18, 2017, 14 Pages.

"International Search Report and Written Opinion Issued in PCT Application No. PCT/US2017/046672", dated Nov. 2, 2017, 13 Pages.

Tanous, Jim, "Why Amazon Cloud Drive Won't Replace Dropbox or OneDrive", Retrieved from: https://www.tekrevue.com/amazon-cloud-drive-ed/, Mar. 31, 2015, 9 Pages.

(56) References Cited

OTHER PUBLICATIONS

Thomas, Peter, "Detecting High Volume Copy Operations on Windows File Systems with LT Auditor+ 2013", Retrieved from: https://bluelance.com/blog-posts/detecting-high-volume-copy-operations-on-windows-file-systems-with-lt-auditor-2013, Jan. 14, 2016, 4 Pages.
"Non Final Office Action Issued in U.S. Appl. No. 15/230,580", dated Oct. 15, 2018, 12 Pages.
"Final Office Action Issued in U.S. Appl. No. 15/241,116", dated Nov. 5, 2018, 22 Pages.
"Non Final Office Action Issued in U.S. Appl. No. 15/238,934", dated May 2, 2019, 9 Pages.
"Final Office Action Issued in U.S. Appl. No. 15/230,580", dated Mar. 21, 2019, 11 Pages.
"Non Final Office Action Issued in U.S. Appl. No. 15/240,004", dated Mar. 8, 2019, 26 Pages.
"Non Final Office Action Issued in U.S. Appl. No. 15/241,116", dated Mar. 6, 2019, 18 Pages.
"Notice of Allowance Issued in U.S. Appl. No. 15/230,580", dated Sep. 5, 2019, 9 Pages.
"Notice of Allowance Issued in U.S. Appl. No. 15/238,934", dated Oct. 3, 2019, 9 Pages.
"Non Final Office Action Issued in U.S. Appl. No. 15/240,004", dated Sep. 18, 2019, 29 Pages.

\* cited by examiner

RETAIN LOCALLY DELETED CONTENT AT STORAGE SERVICE

BACKGROUND

Increasingly, cloud storage providers are utilized for storing and/or sharing content across multiple clients, where the cloud storage providers have engines that automatically synchronize the content between the clients. However, complaints are frequently received that the cloud storage providers are accidentally deleting files in the cloud via unintended actions on the clients. For example, a user who has a file on their computing device that is synchronized to the cloud may delete the file locally on the computing device if they run out of local storage space, are wiping the computing device, and/or are giving the computing device to someone else, for example. Because the file was synchronized to the cloud, the delete is propagated to the cloud which further causes the delete to replicate to the other clients. Unfortunately, the user may not have intended for the delete to propagate to the cloud and the other clients. Moreover, attackers may take advantage of this vulnerability by deleting locally stored content and having it replicate to the cloud and other devices.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to retainment of locally deleted content at a storage service to prevent accidental or nefarious local deletions of content from causing the content to be deleted universally across the storage service and/or multiple other devices comprising the content. For example, the storage service may be configured to receive content stored locally on the device, detect a deletion of the content on the device, and retain the content at the storage service.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
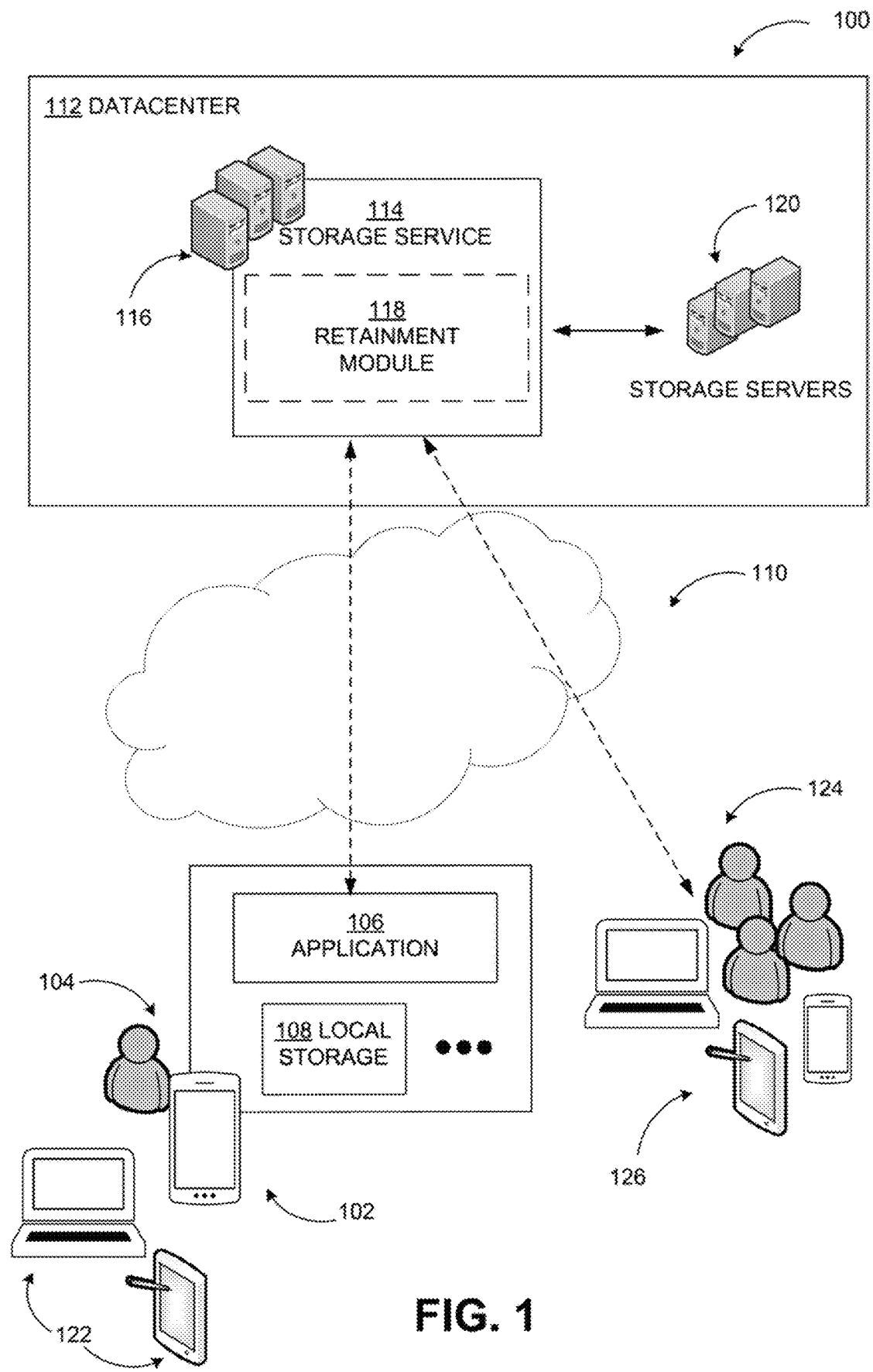
FIG. 1 includes an example network environment where a system to retain locally deleted content may be implemented.

As briefly described above, embodiments are directed to retainment of locally deleted content at a storage service to prevent accidental or nefarious local deletions of content from causing the content to be deleted universally across the storage service and/or multiple other devices comprising the content. The storage service may be configured to receive content stored locally on the device through a synchronization action, for example. The storage service may be configured to detect a deletion of the content on the device, and retain the content at the storage service. Once the content is retained, the storage service may prevent the retained content from being downloaded and stored locally on the device when content at the storage service and the device are synchronized. However, in response to a determination that the retained content has been modified, the storage service may be configured to enable the modified content to be downloaded and stored locally on the device when content at the storage service and the device are synchronized.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for retaining locally deleted content at a storage service. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes an example network environment where a system to retain locally deleted content may be implemented.

As illustrated in diagram 100, an example system may include a datacenter 112 hosting a cloud-based storage service 114 configured to provide storage for and enable sharing of content that may be accessed across multiple devices and users. The datacenter 112 may include one or more processing servers 116 configured to execute the storage service 114, among other components. In some embodiments, at least one of the processing servers 116 may be operable to execute a retainment module 118 of the storage service 114, where the retainment module 118 may be integrated with the storage service 114 to prevent accidental or nefarious local deletions of content from a device 102 from causing the content to be deleted universally across the storage service 114 and/or multiple other devices (such as devices 122, 126). In other embodiments, this function may be inherently present within the storage service 114 itself. The datacenter 112 may also include one or more storage servers 120 configured to manage one or more data stores comprising data associated with content retained by the storage service 114 and/or retainment module 118. As described herein, the storage service 114 and/or retainment module 118 may be implemented as software, hardware, or combinations thereof.

In some embodiments, the storage service 114 may be configured to interoperate with various applications to synchronize files stored locally on user associated devices with the same files stored remotely at the storage service 114. For example, as illustrated in the diagram 100, a user 104 may execute a thin (e.g., a web browser) or a thick (e.g., a locally installed client application) version of an application 106 through the device 102 with which the storage service 114 may be configured to integrate and interoperate with over one or more networks, such as network 110. The application 106 may be an application hosted by the storage service, such as a synchronization client, for example. The device 102 may include a desktop computer, a laptop computer, a tablet computer, a vehicle mount computer, a smart phone, or a wearable computing device, among other similar devices. A communication interface may facilitate communication between the storage service 114 and the application 106 over the network 110.

In an example embodiment, the storage service 114 may be configured to receive content stored on local storage 108 of the device 102. The received content may be stored remotely at the storage service 114 within the storage servers 120, for example. Periodic synchronization between the content stored on local storage 108 of the device 102 and the content stored remotely at the storage service 114 may be performed to ensure a most updated version of the content is stored and/or shared at each location. In some examples, a selectable feature of the device 102 and/or a selectable feature of a folder containing the content may be retainment of locally deleted content at the storage service 114. In one embodiment, configuration options may be provided to the user 104 through a user experience of the application 106 to enable selection of such features (see FIGS. 3A-B). For example, the user 104 may select for locally deleted content on a particular device, such as the device 102, or within a particular folder to only be removed from the device 102 or folder, and not from the storage service 114. In response to the user selection, the storage service 114 may be configured to tag the device 102 or the folder as a local deletes only device or a local deletes only folder, respectively. In some embodiments, the storage service 114 may also be configured to track a version of the content at a time at which the device 102 or the folder is tagged.

The storage service 114 may be configured to detect a deletion of the content from the local storage 108 of the device 102. In response to detecting the local deletion, the storage service 114 may be configured to retain the content at the storage service 114, where the retained content may be stored in the storage servers 120, or in other third party storage services, for example. In one embodiment, once the content is retained, the storage service 114 may prevent the retained content from being downloaded and stored locally on the device 102 when the content at the storage service 114 and the local storage 108 of the device 102 are periodically synchronized. Additionally and/or alternatively, the application 106 may keep track of the content that has been deleted from the device 102 to block previously deleted content, such as the retained content, from being downloaded by the device 102 for storage at the local data store 108 of the device 102 during synchronization. However, in response to a determination that the retained content has been modified, the storage service 114 and/or the application 106 may be configured to enable the modified content to be downloaded and stored on the local storage 108 of the device 102 when the content at the storage service 114 and the local storage 108 of the device 102 are synchronized. For example, the storage service 114 may retrieve the retained content from the storage servers 120 upon determination that that the retained content has been modified such that the modified content may be downloaded from the storage service 114 and stored on the local storage 108 of the device 102 during the next content synchronization.

In another example embodiment, the user 104 may not have selected to retain locally deleted content at the storage service 114 as a feature of the device 102 and/or folder, and thus the device 102 and/or the folder may not be tagged as a local deletes only device or a local deletes only folder at the storage service 114. Therefore, deletion options may be provided to the user 104 through a user experience of the application 106 in response to the user deleting the content on the device 102. The deletion options may include deleting the content from the local storage 108 of the device 102, deleting the content stored locally on other devices 122 associated with the user 104, and deleting the content stored remotely at the storage service 114. The storage service 114 may then be configured to retain the content based on the selected deletion options. In some scenarios, the user 104 may be sharing the content with one or more other users 124, and the content may also be stored locally on further devices 126 associated with the other users 124. As a practical effect, if the user 104 chooses to delete the content stored remotely at the storage service 114, the content will also be locally deleted from the further devices 126 associated with the other users 124 during a next synchronization process, which may be an effect unintended by the user 104. As such a prompt and/or warning may be provided to the user 104 to ensure the user 104 is made aware of the effects of deleting the content from the storage service 114. The content may then be retained at the storage service 114 based on the deletions options selected by the user 104.

Additionally, the user 104 may be provided with options to configure the device 102 as a master device through the user experience of the application 106. If the device 102 is a master device, and the locally stored content is deleted from the master device, the storage service 114 may automatically delete the content stored locally at the master device (device 102) and remotely at the storage service 114 after detecting the deletion. Again, as a practical effect, if the user 104 configures the device 102 as a master device and proceeds to delete the content stored locally at the master device, the content will also be locally deleted from the further devices 126 associated with the other users 124 during a next synchronization process. As such a prompt and/or warning may be provided to the user 104 to ensure the user 104 is made aware of the effects of configuring the device 102 as a master device. In an example scenario, the user 104 may select an option to configure his desktop computer as a master device, as the user 104 may be less likely to make accidental deletes on his desktop than he is on his mobile devices, such as smart phones and tablets, due to the nature of when and how the user 104 interacts with each device.

Some of the actions and/or processes described herein have been illustrated from the perspective of a server (for example, the processing servers 116 configured to execute the storage service), however the same actions may be performed similarly by a client (for example, the application 106), among other entities. Additionally, some of the actions and/or processes described herein have been illustrated from the perspective of the client, however the same actions may be performed similarly by the server.

Conventionally, some cloud-based storage services and/or providers may offer a selective synchronization functionality, which enables users the ability, per device, to select which content to synchronize up to the storage service or down to the device. However, when the selected content, such as a file, is deleted locally on a user device, that file may also be deleted from a cloud-based storage service. For example, the file may be put into a recycle bin and permanently deleted a particular time period later. Therefore, if the user performs accidental deletes or an application deletes data on behalf of the user without their knowledge, the storage service will still permanently delete the data. As a result, the content will further be deleted on any other devices associated with the user and/or further devices associated with other users that locally store the content during the next synchronization process causing a universal delete. As described in FIG. 1, embodiments are directed to a feature for cloud-based storage services that enables content to be deleted from a certain device and/or folder without being deleted from the storage service and/or other devices comprising the content to protect users from deletes accidentally performed by themselves or nefariously performed by attackers. User interactivity may be increased by enabling users to select the feature to retain locally deleted content at the storage service and/or deletion options regarding retainment of the content, which may also enhance reliability by ensuring that no accidental or nefarious deletions cause an unintended universal delete. Additionally, when content is locally deleted from a device, the retained content at the storage service is no longer synchronized to the device reducing processor and memory usage along with bandwidth usage due to reduced device-to-server communications. However, if the content retained at the storage service is modified, then the modified content may be synchronized to the device again enhancing user interactivity and reliability.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with large numbers of devices and users storing and/or sharing content both locally at client devices and remotely at cloud-based storage services.

Figure 2:
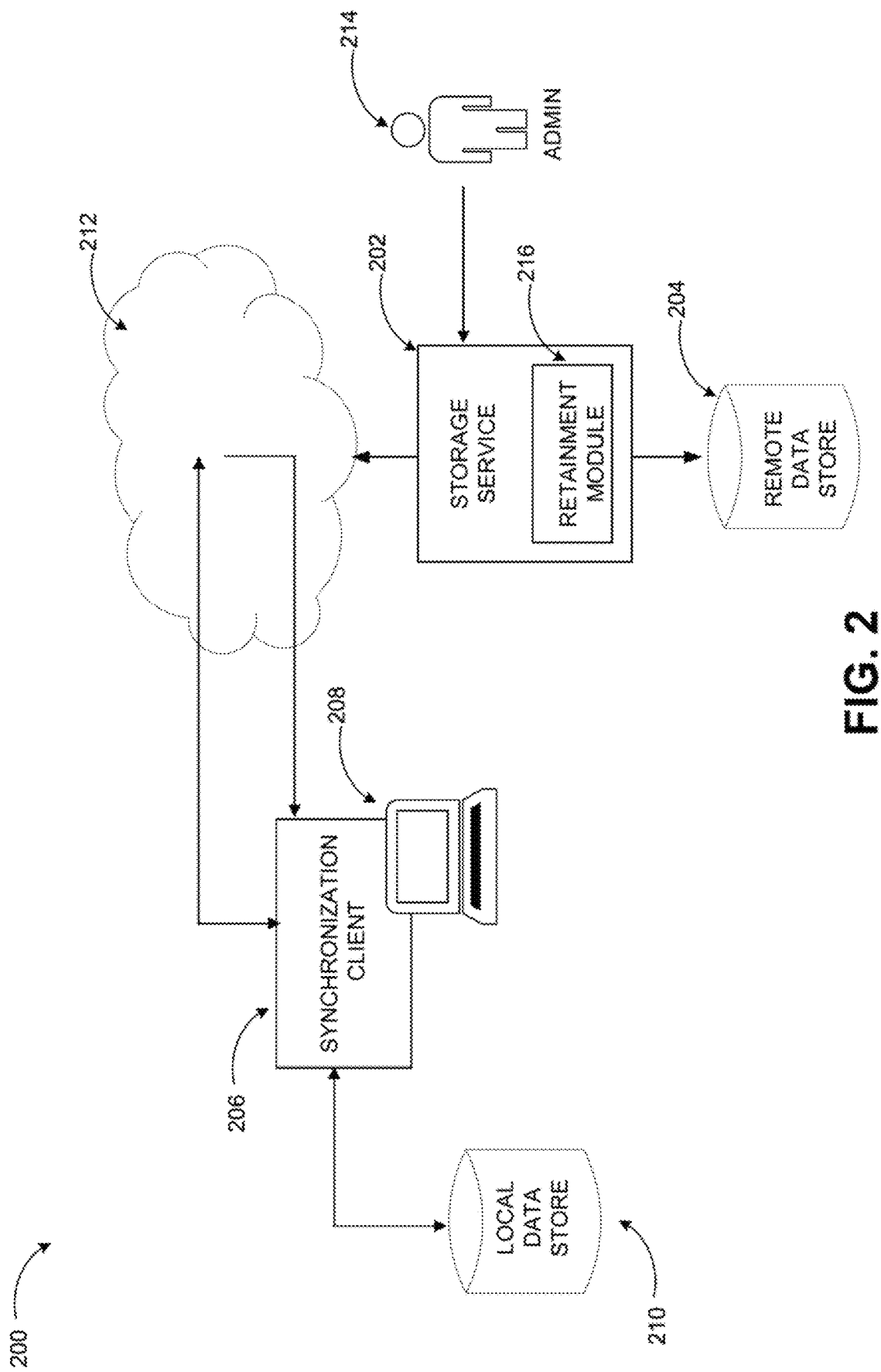
FIG. 2 includes a conceptual diagram illustrating an example process for retaining content at a storage service in response to a local deletion of the content from a device.

FIG. 2 illustrates an example process for retaining content at a storage service in response to a local deletion of the content from a device. As shown in a diagram 200, a cloud-based storage service 202 may be configured to store content in a remote data store 204 associated with the storage service 202 and/or a third party storage service. In some embodiments, the storage service 202 may be configured to integrate and interoperate with a synchronization client 206 executing on a device 208, to enable periodic synchronization between content stored at a local data store 210 of the device 208 and content stored at the remote data store 204, over one or more networks 212. For example, content may be downloaded from the storage service 202 to be stored at the local data store 210 of the device 208 and/or content from the device 208 may be uploaded to the storage service 202 and stored in the remote data store 204 based on one or more rules. In some examples, the rules may be defined by a user associated with the device 208. In other examples, an administrator 214, such as an information technology manager at a company or organization, may define the rules for security, data management, and data discovery purposes, among other reasons. Synchronization may ensure that the most updated content is stored both locally at the device 208 and remotely at the storage service 202.

Additionally, the storage service 202 may include a retainment module 216. The retainment module 216 may be configured to prevent accidental or nefarious deletions of the content stored in the local data store 210 of the device 208 from causing the content to be deleted from the remote data store 204 of the storage service 202. In one embodiment, retainment of the content at the storage service 202 may be a feature of the device 208 and/or a feature of a folder containing the content that may be selected or enabled by the user associated with the device 208 or the administrator 214. For example, the administrator 214 may select for deleted content of the folder to only be removed from the local data store 210 of the device 208, and not from the remote data store 204 of the storage service 202. The administrator 214 may select this feature through an administrative portal associated with the storage service 202, for example. In response to the administrator's selection, the retainment module 216 may tag the folder as a local deletes only folder.

In an example scenario, a group of team members may be working on a project. All content associated with the project has been received by the storage service 202 and stored in a folder shared among all group members at the remote data store 204 of the storage service 202. The device 208 may be associated with a member of that group, for example. In addition to having access to the folder through the storage service 202, the member may have the folder stored at the local data store 210 of the device 208 so that he may easily access the documents without the need for a wired and/or wireless connection to the network 212, for example. However, the member may be finished with his portion of the project, and may delete the folder or various content within the folder from the local data store 210 on the device 208 to conserve local storage space, for example. Conventionally, because the folder was synchronized to the storage service 202, the delete would be propagated to the storage service 202 which would cause the folder and/or content within the folder to be deleted from the remote data store 204 of the storage service 202 as well. As a result, the deletion of the folder and/or content within the folder would be propagated to any other devices associated with the member or even other members of that group who had the folder locally stored and synchronized with the storage service 202 causing a universal delete. However, by tagging the folder as a local deletes only folder, the retainment module 216 may be configured to prevent such unintended mass deletion. For example, the retainment module 216 may detect a deletion of the folder from the local data store 210 on the device 208. In response to detecting the deletion, the retainment module 216 may identify the folder as a local deletes only folder based on the tag, and retain the content within the folder at the remote data store 204 of the storage service 202.

In one embodiment, once the content is retained, the storage service 202 may prevent the retained content from being downloaded by the device 208 for storage at the local data store 210 of the device during synchronization. Additionally and/or alternatively, the synchronization client 206 may keep track of the content that has been deleted from the device 208, and block previously deleted content, such as the retained content, from being downloaded by the device 208 for storage at the local data store 210 of the device during synchronization. In response to a determination that the retained content has been modified at the storage service 202, for example by other team members, the storage service 202 and/or synchronization client 206 may be configured to enable the modified content to be downloaded by the device 208 for storage at the local data store 210 of the device during synchronization. This may be another type of feature and/or option selectable by the user or the administrator 214.

Figure 3A:
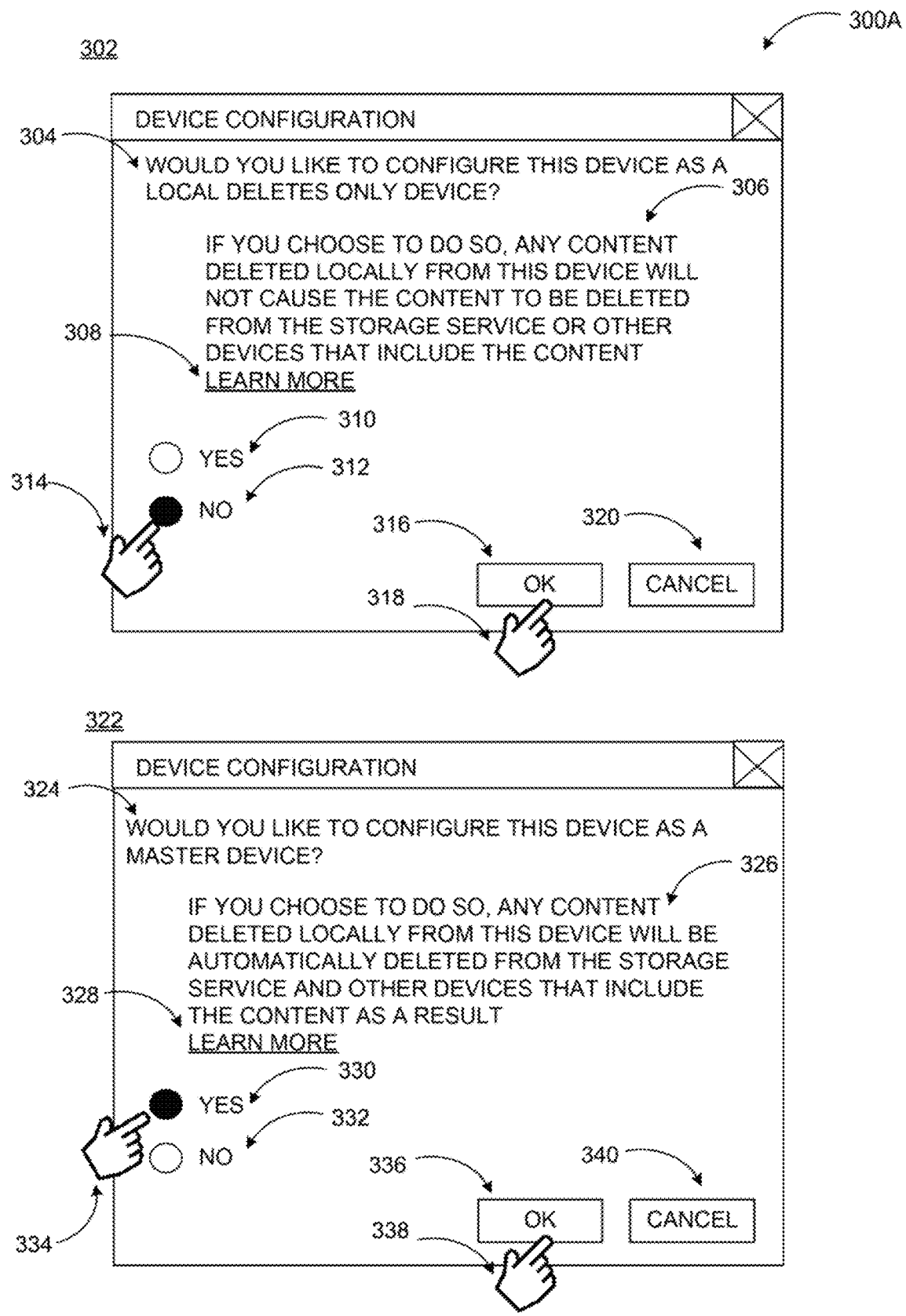
FIGS. 3A-B include example configuration options provided to enable locally deleted content to be retained at a storage service.
Figure 3B:
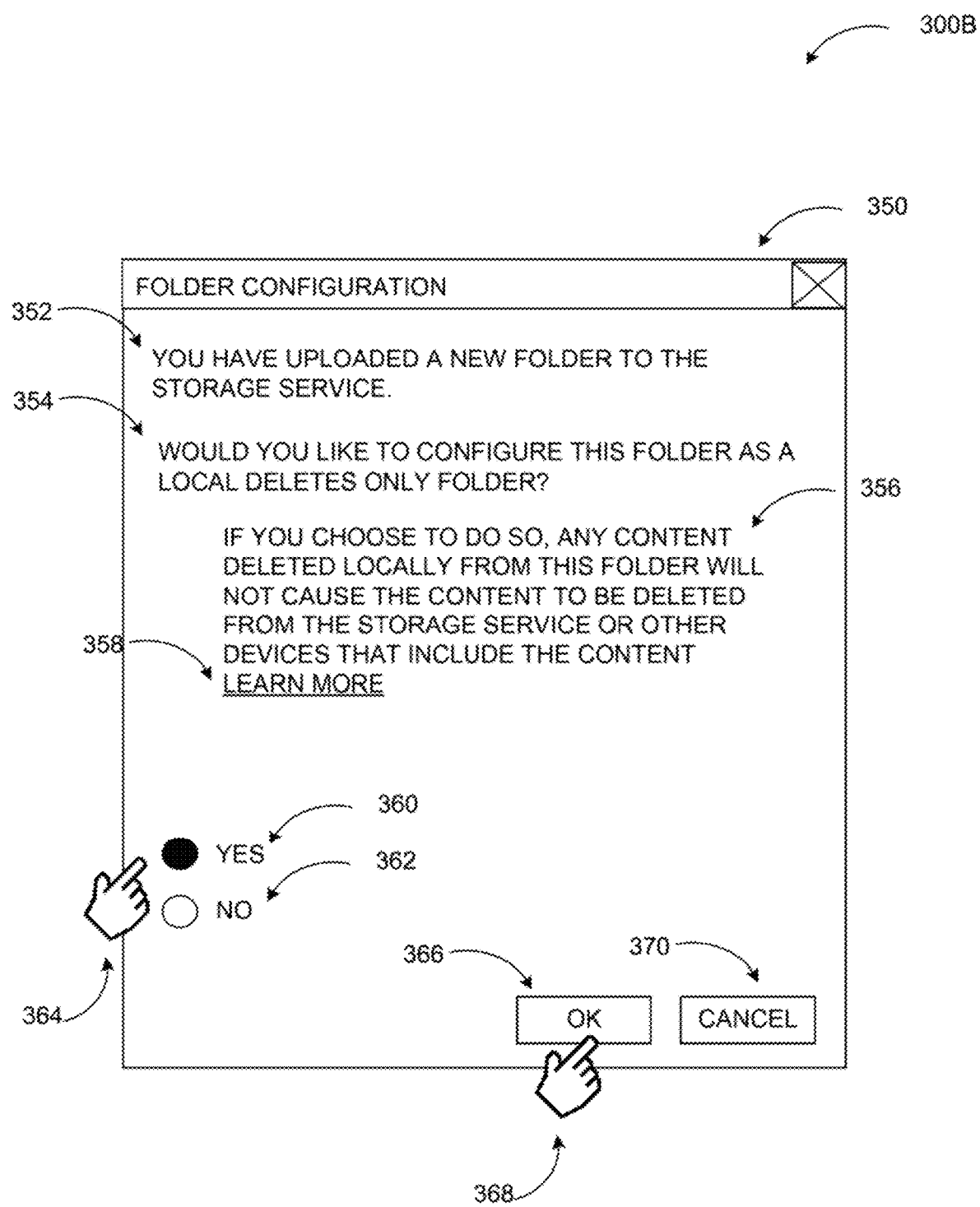

FIGS. 3A-B include example configuration options provided to enable locally deleted content to be retained at a storage service. The storage service may be configured to receive content stored locally on a device for remote storage, and periodic synchronization may be performed between the content stored locally on the device and the content stored remotely at the storage service. In some examples, a selectable feature of the device and/or a feature of a folder containing the content may enable retainment of the content at the storage service after deletion of the content on the device. Configuration options, as shown in diagrams 300A and 300B, may be provided to a user of the device through a user experience of an application associated with the storage (a synchronization client executing on the device, for example), to enable selection of such features.

As shown in a diagram 300A of FIG. 3A, a first device configuration option 302 may be provided. The first device configuration option 302 may be displayed as dialog box, a notification window, and/or a pane, among other examples, and include a main instruction 304 and a prompt 306 followed by two possible selections ("yes" 310 and "no" 312). As illustrated, the main instruction 304 may inquire whether the user would like to configure the device as a local deletes only device. The prompt 306 may describe the effects and/or purpose of configuring the device as a local deletes only device. For example, the prompt 306 may indicate that if the device is configured as a local deletes only device, any content that is deleted locally from the device will not cause the content to be deleted at the storage service or other devices including the content (that is, the content will be retained at the storage service). The prompt 306 may also include a link 308 to more detailed information regarding these effects and/or purpose. The user may select either "yes" 310 or "no" 312 in response to the main instruction 304. If the user selects "yes" 310, and then an "OK" command 316, the device will be configured as a local deletes only device. As a result, the storage service may tag this device as a local deletes only device at the storage service such that any locally deleted content on the device is retained at the storage service in response to detection of the deletion. If the user does not wish to configure the device, the user may select a "Cancel" command control 320. If the configuration is canceled, the device will not be tagged as a local deletes only device and deletion options may be presented to the user in response to detection of a local deletion of the content as described in conjunction with FIGS. 4A-B below. If the user selects "no" 312, and then the "OK" command 316 (as illustrated by a first user selection 314 and a second user selection 318), a second device configuration option 322 may then be provided.

The second device configuration option 322 may be displayed as dialog box, a notification window, and/or a pane, among other examples, and include a main instruction 324 and a prompt 326 followed by two possible selections ("yes" 330 and "no" 332). As illustrated, the main instruction 324 may inquire whether the user would like to configure the device as a master device. The prompt 326 may describe the effects and/or purpose of configuring the device as a master device. For example, the prompt 326 may indicate that if the device is configured as a master device, any content that is locally deleted from the device will be automatically deleted at the storage service (that is, the content will not be retained at the storage service) and thus will be deleted from other devices of the user or devices of other users that include the content as a result. The prompt 326 may also include a link 328 to more detailed information regarding these effects and/or purpose. The user may select either "yes" 330 or "no" 332 in response to the main instruction 324. If the user selects "yes" 330, and then an "OK" command 336 (as illustrated by a third user selection 334 and a fourth user selection 338), the device will be configured as a master device. As a result, the storage service may tag this device as a master device at the storage service such that any content stored locally on the device that is deleted from the device is automatically deleted (or not retained) at the storage service. If the user does not wish to configure the device, the user may select a "Cancel" command control 340. If the configuration is canceled, the device will not be tagged as a master device.

As shown in diagram 300B of FIG. 3B, a folder configuration option 350 may be provided additionally and/or alternatively to device configuration options. In one embodiment, the folder configuration option 350 may be provided in response to an upload and/or download of a new folder to or from the storage service on the device, for example. The folder configuration option 350 may be displayed as dialog box, a notification window, and/or a pane, among other examples, and include a detected action 352, a main instruction 354, and a prompt 356 followed by two possible selections ("yes" 360 and "no" 362). As illustrated, the detected action 352 may include detection of a locally stored folder of the device being uploaded to the storage service for a first time, for example. The main instruction 354 may inquire whether the user would like to configure the folder as a local deletes only folder. The prompt 356 may describe the effects and/or purpose of configuring the folder as a local deletes only folder. For example, the prompt 356 may indicate that if the folder is configured as a local deletes only folder, any content that is deleted locally from that folder will not cause the content to be deleted at the storage service or other devices including the content (that is, the content will be retained at the storage service). The prompt 356 may also include a link 358 to more detailed information regarding these effects and/or purpose. The user may select either "yes" 360 or "no" 362 in response to the main instruction 354. If the user selects "yes" 360, and then an "OK" command 366 (as illustrated by a first user selection 364 and a second user selection 368), the folder will be configured as a local deletes only folder. As a result, the storage service may tag this folder as a local deletes only folder at the storage service such that any content that is deleted from this folder locally is retained at the storage service. If the user does not wish to configure the folder, the user may select a "Cancel" command control 370. If the configuration is canceled, the folder will not be tagged as a local deletes only folder and content may not be retained at the storage service if it is locally deleted. Instead, deletion options may be presented to the user in response to detection of a local deletion of the content, as described in conjunction with FIGS. 4A-B below.

Figure 4A:
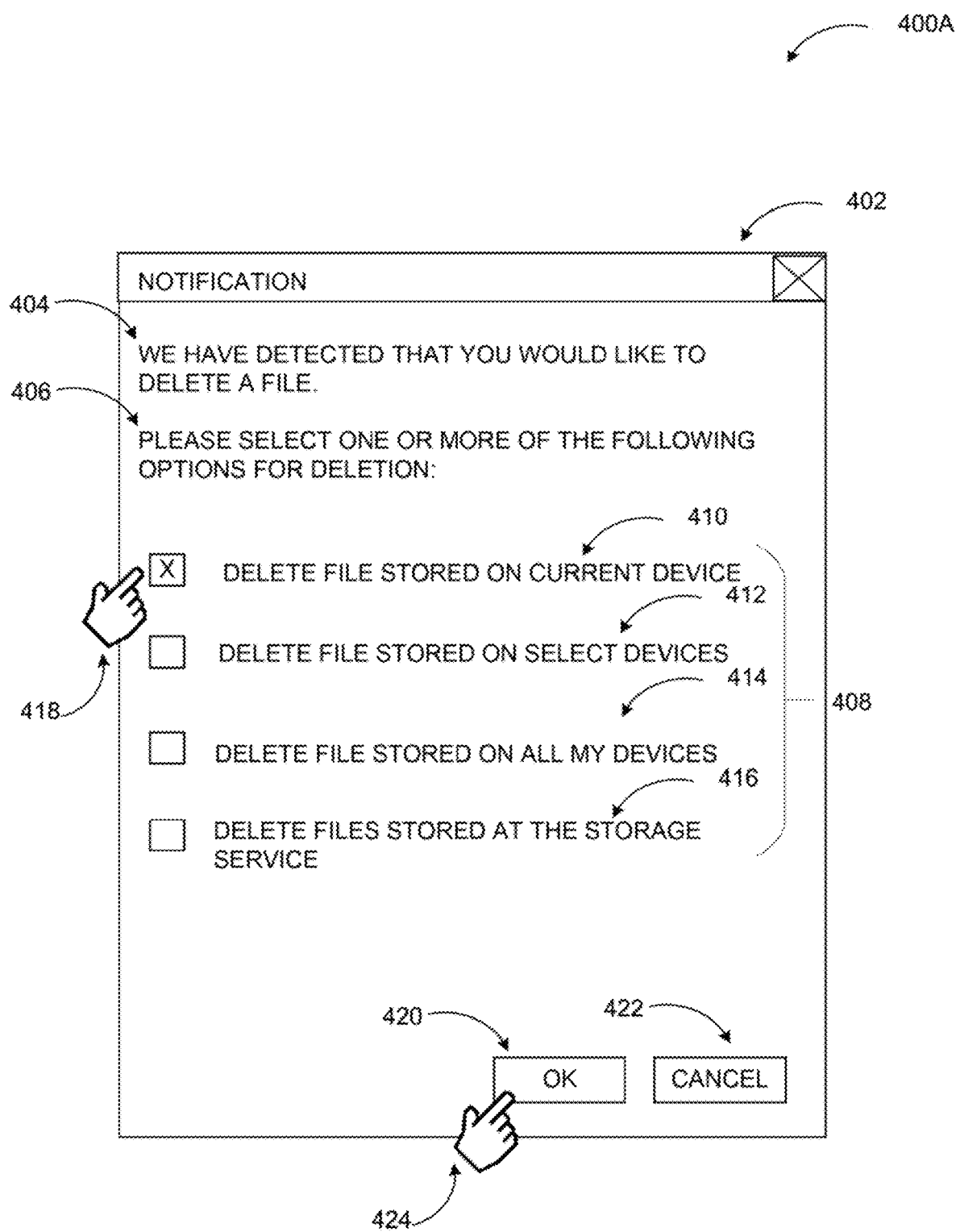
FIGS. 4A-B include example notifications provided in response to a local deletion of content on a device.
Figure 4B:
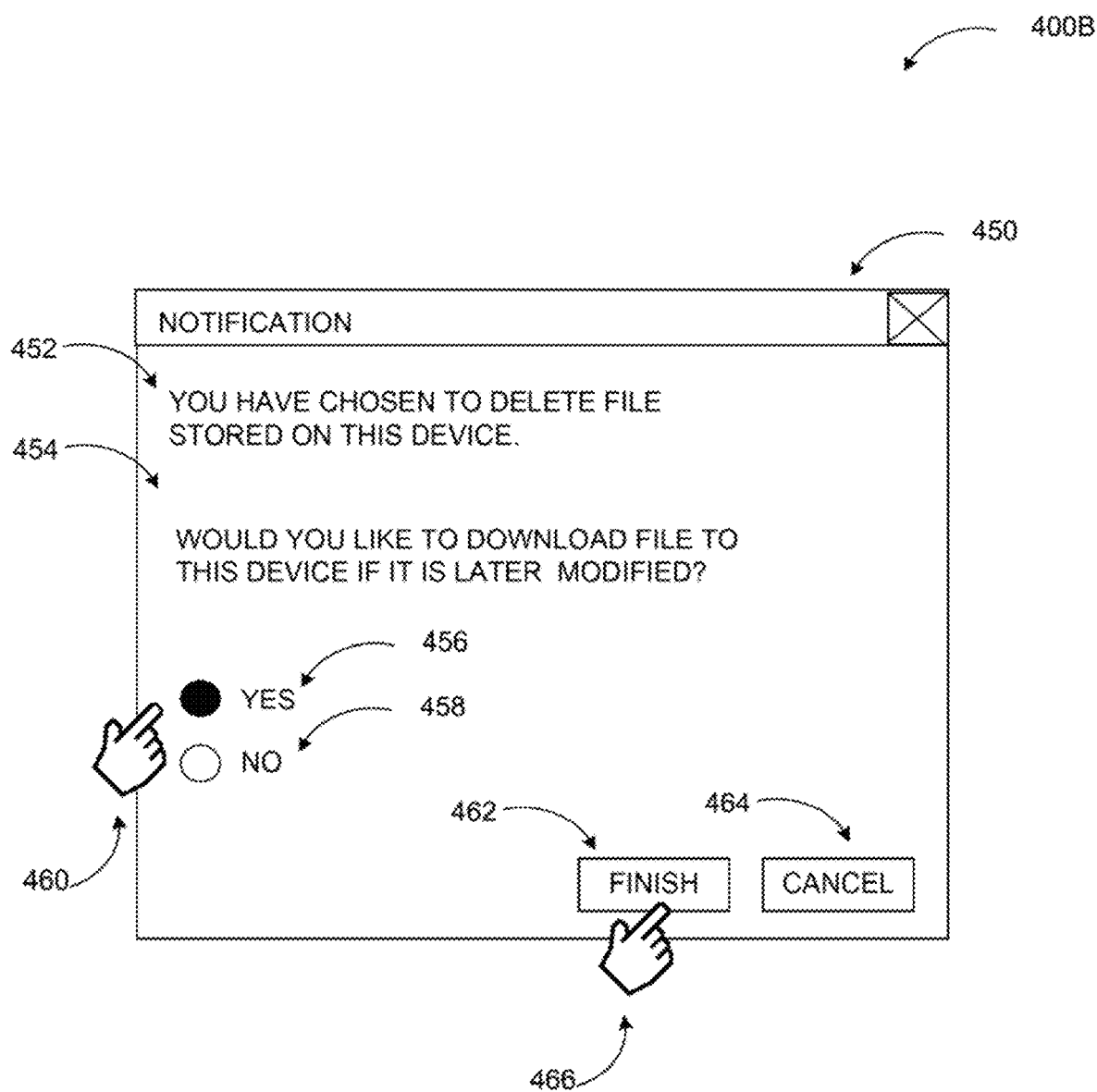

FIGS. 4A-B include example notifications provided in response to a local deletion of content from a device. As previously discussed, a cloud-based storage service may be provided to store and enable sharing of content that may be accessed across multiple devices and users. For example, the storage service be configured to receive content stored locally on a device for remote storage at the service. Periodic synchronization between the content stored locally on the device and the content stored remotely at the storage service may be performed through a synchronization client executing on the device to ensure a most updated version of the content is stored and/or shared at each location. The storage service may be configured to detect a deletion of the content from the device. As previously discussed, if a user of the device has not selected to retain locally deleted content at the storage service as a feature of the device and/or as a feature of folder containing the content, then neither the device and/or the folder may be tagged at the storage service as a local deletes only device and/or local deletes only folder. If no tag is identified by the storage service in response to the detection of the deletion, the storage service and/or the synchronization client may be configured to provide one or more deletion options through a user interface associated with the synchronization client. The storage service may then be configured to retain the content based on the deletion option(s) selected.

As shown in a diagram 400A of FIG. 4A, the deletion options for the content may be provided as a notification 402 through the user interface. The notification 402 may include a detected action 404 to provide context for why the notification 402 is being provided and a main instruction 406 to suggest the user make one or more selections among one or more deletion options 408 presented. For example, the detected action 404 may be a deletion of a particular file. The main instruction 406 may suggest the user select among the deletion options 408 for the particular file. The deletion options 408 may include to delete the file stored on the current device 410, delete the file stored on select devices associated with the user 412, delete the file stored on all devices associated with the user 414, and delete the file stored at the storage service 416. The deletion options 408 may be selectable via buttons, toggles, and/or other similar graphical controls. The user may select 418 one or more of the deletion options 408 (for example, delete the file stored on the current device 410), and select an "OK" command control 420. If the user no longer wishes to delete the file, the user may select a "Cancel" command control 422.

In response to a user selection 424 of the "OK" command control 420, another notification 450 may be displayed through the user interface associated with the synchronization client, as shown in a diagram 400B of FIG. 4B. The notification 450 may include a prompt 452 to confirm the previous deletion option selected by the user and a main instruction 454 to provide the user options to download the deleted file to the current device if it is later modified at the storage service. The options to download may include "yes" 456 or "no" 458. The presented options 456, 458 may be selectable via buttons, toggles, and/or other similar graphical controls. The user may select 460 one of the presented options 456, 458 (for example, "yes" 456), and select 466 a "Finish" command control 462. If the user no longer wishes to delete the file, the user may select a "Cancel" command control 464.

Based on the illustrated selections in FIG. 4A-B, in response to detecting the deletion of the file on the current device, the storage service may be configured to retain the file stored remotely at the storage service. Once the content is retained, the storage service and/or synchronization client may prevent the retained file from being downloaded and stored locally on the current device during synchronization. However, in response to a determination that the retained file has been modified by the user or other users, the storage service and/or synchronization client may be configured to enable the modified file to be downloaded and stored locally on the current device.

Figure 5:
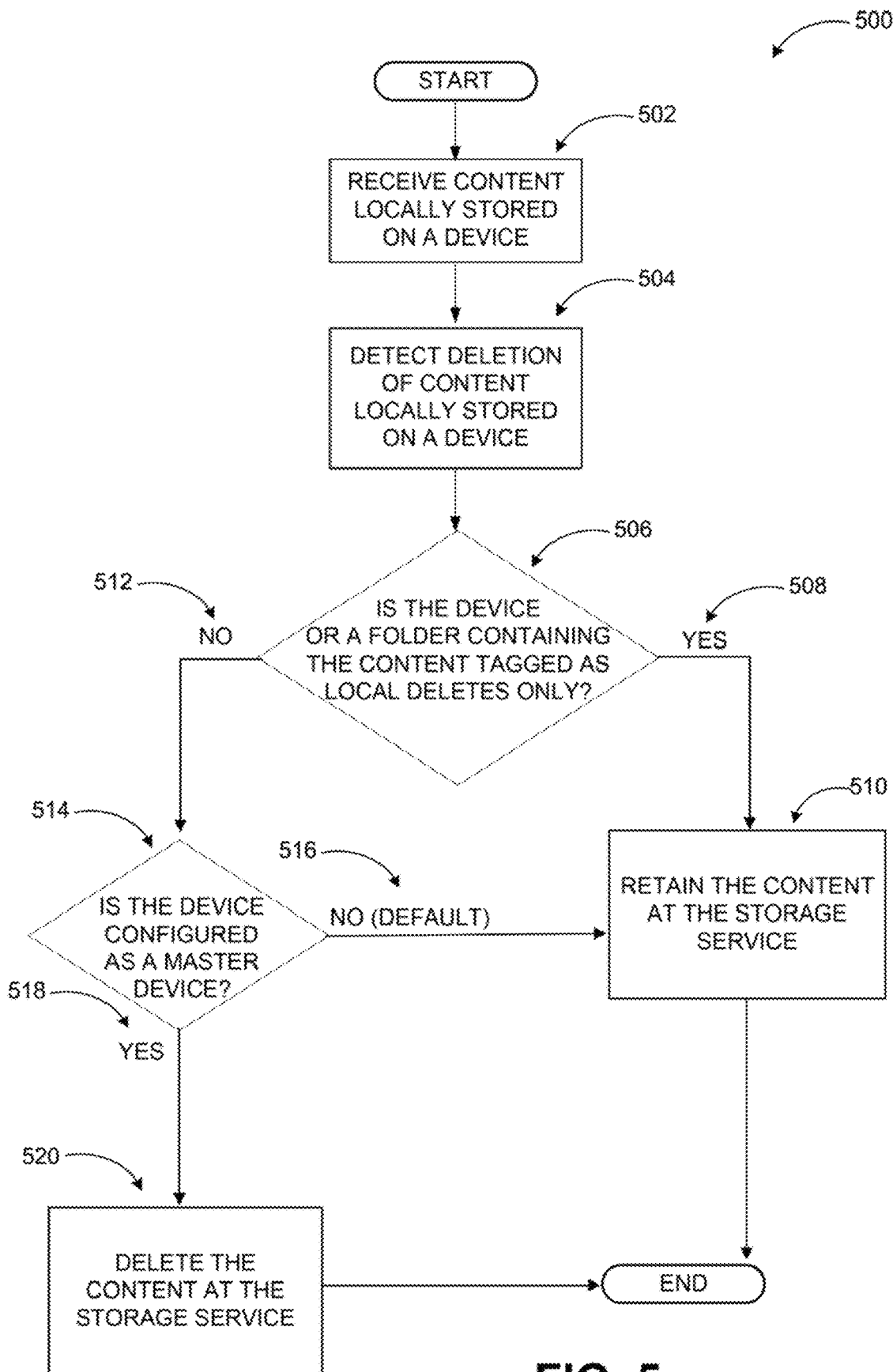
FIG. 5 includes a flow process for determining whether to retain or delete content at a storage service in response to detecting a local deletion of the content on a device.

FIG. 5 includes a flow process for determining whether to retain or delete content at a storage service in response to detecting a local deletion of the content from a device.

As shown in a diagram 500, a storage service may receive content locally stored on a device 502. Periodic synchronization between the content stored locally on the device and the content stored remotely at the storage service may be performed through a synchronization client executing on the device, for example, to ensure a most updated version of the content is stored and/or shared at each location. In some examples, a selectable feature of the device and/or a feature of a folder containing the content may be retainment of the content at the storage service. For example, a user or administrator may select for deleted content from the device or folder to only be removed from the device, and not from the storage service. This feature selection may cause the storage service to tag the device or the folder as a local deletes only device or a local deletes only folder, respectively. In further examples, the user or administrator may also be enabled to designate the device as a master device such that the content is not retained the storage service when the deletion of the content occurs through the master device.

The storage service may detect a deletion of the content from the device 504. In response to detection, the storage service may identify whether or not the device or the folder containing the content is tagged as local deletes only 506. If the storage service identifies that the device or folder is tagged as local deletes only 508, then the storage service may be configured to retain the content at the storage service 510. If the storage service identifies that the device or folder is not tagged as local deletes only 512, then the storage service may determine whether the device is configured as a master device 514. If the device is not configured as the master device 516, the storage service, by default, may retain the content at the storage service 510 at least temporarily. In some embodiments, deletion options may be provided to the user, as described above in conjunction with FIGS. 4A-B, where retainment may be based on the selected deletion option(s). If the device is configured as the master device 518, the storage service may be configured to delete the content at the storage service 520. Effectively, deletion of the content at the storage service may then further cause deletion of the content that is stored locally on other devices associated with the user and/or other users and is synchronized with the storage service.

The examples provided in FIGS. 1 through 5 are illustrated with specific systems, services, applications, modules, and notifications. Embodiments are not limited to environments according to these examples. Retaining locally deleted content at a storage service may be implemented in environments employing fewer or additional systems, services, applications, engines, and user experience configurations. Furthermore, the example systems, services, applications, modules, and notifications shown in FIG. 1 through 5 may be implemented in a similar manner with other values using the principles described herein.

Figure 6:
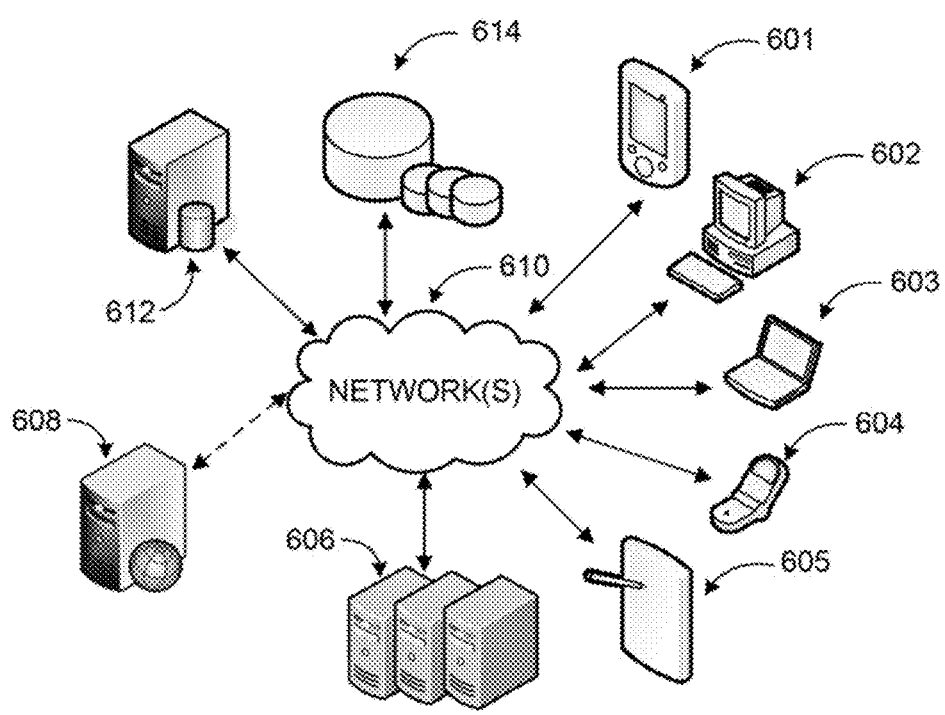
FIG. 6 is a networked environment, where a system according to embodiments may be implemented.

FIG. 6 is a networked environment, where a system according to embodiments may be implemented. In addition to locally installed applications (for example, application 106 or synchronization client 206), a retainment module (for example, retainment module 118 or 216) may also be employed in conjunction with hosted applications and services (for example, a storage service 114) that may be implemented via software executed over one or more servers 606 or individual server 608, as illustrated in diagram 600. A hosted service or application may communicate with client applications on individual computing devices such as a handheld computer 601, a desktop computer 602, a laptop computer 603, a smart phone 604, a tablet computer (or slate), 605 ('client devices') through network(s) 610 and control a user interface presented to users.

Client devices 601-605 are used to access the functionality provided by the hosted service or application. One or more of the servers 606 or server 608 may be used to provide a variety of services as discussed above. Relevant data may be stored in one or more data stores (e.g. data store 614), which may be managed by any one of the servers 606 or by database server 612.

Network(s) 610 may comprise any topology of servers, clients, Internet service providers, and communication media. A system according to embodiments may have a static or dynamic topology. Network(s) 610 may include a secure network such as an enterprise network, an unsecure network such as a wireless open network, or the Internet. Network(s) 610 may also coordinate communication over other networks such as PSTN or cellular networks. Network(s) 610 provides communication between the nodes described herein. By way of example, and not limitation, network(s) 610 may include wireless media such as acoustic, RF, infrared and other wireless media.

Many other configurations of computing devices, applications, engines, data sources, and data distribution systems may be employed for retainment of locally deleted content at a storage service. Furthermore, the networked environments discussed in FIG. 6 are for illustration purposes only. Embodiments are not limited to the example applications, engines, or processes.

Figure 7:
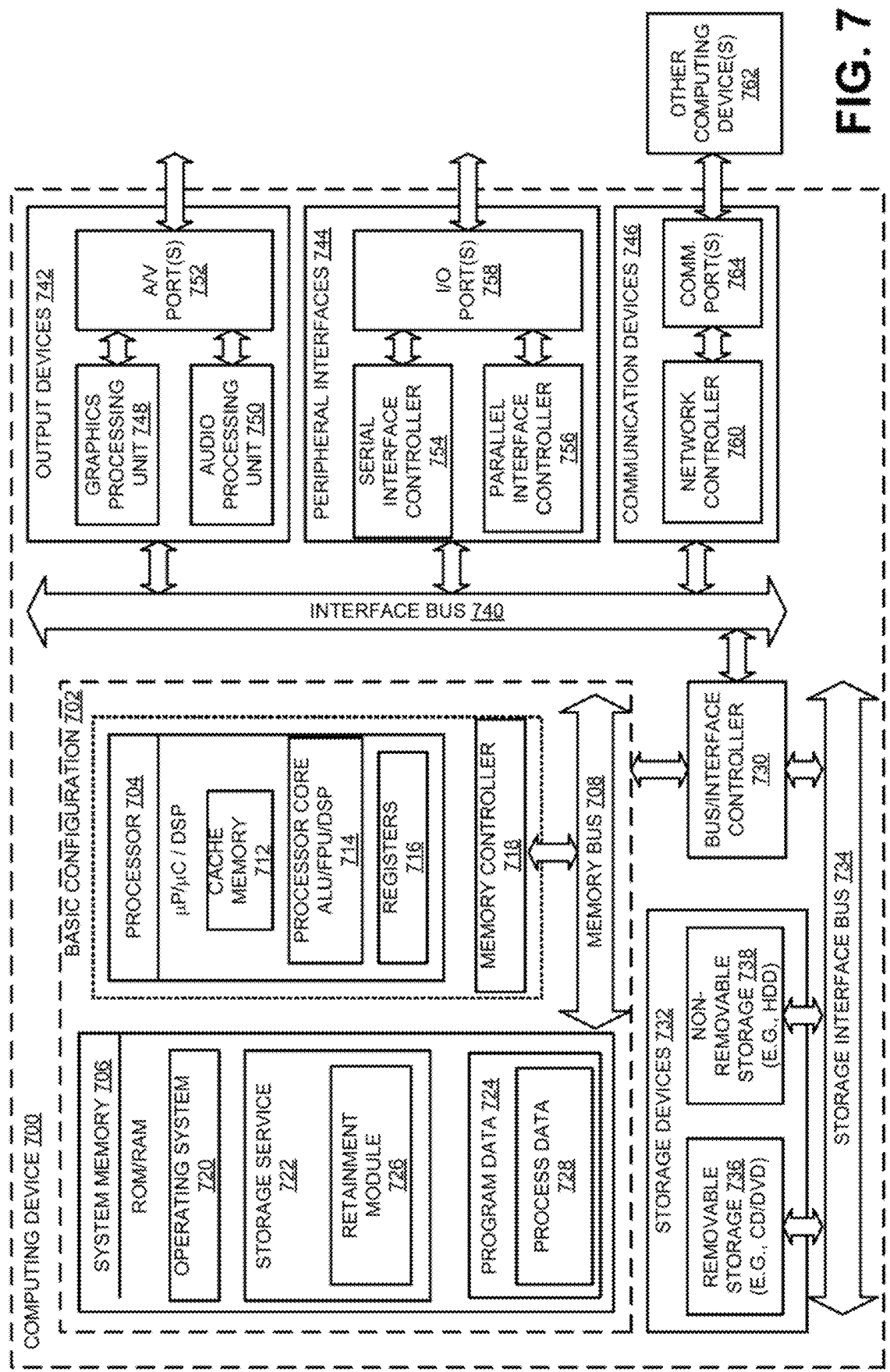
FIG. 7 is a block diagram of an example general purpose computing device, which may be used to retain locally deleted content at a storage service.

FIG. 7 is a block diagram of an example general purpose computing device, which may be used to retain locally deleted content at a storage service.

For example, computing device 700 may be used as a server, desktop computer, portable computer, smart phone, special purpose computer, or similar device. In an example basic configuration 702, the computing device 700 may include one or more processors 704 and a system memory 706. A memory bus 708 may be used for communicating between the processor 704 and the system memory 706. The basic configuration 702 is illustrated in FIG. 7 by those components within the inner dashed line.

Depending on the desired configuration, the processor 704 may be of any type, including but not limited to a microprocessor (µP), a microcontroller (µC), a digital signal processor (DSP), or any combination thereof. The processor 704 may include one more levels of caching, such as a level cache memory 712, one or more processor cores 714, and registers 716. The example processor cores 714 may (each) include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, a storage service 722, and program data 724. The collaboration database service 722 may include a retainment module 726, which may be an integrated module of the storage service 722. The storage service 722 and/or retainment module 726 may be configured to receive, at the storage service 722, content stored locally in a device, detect a deletion of the content on the device, and retain the content at the storage service. The program data 724 may include, among other data, process data 728, such as the content retained at the storage service 722, as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example communication device 746 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

Example embodiments may also include methods to retain locally deleted content at a storage service. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 8:
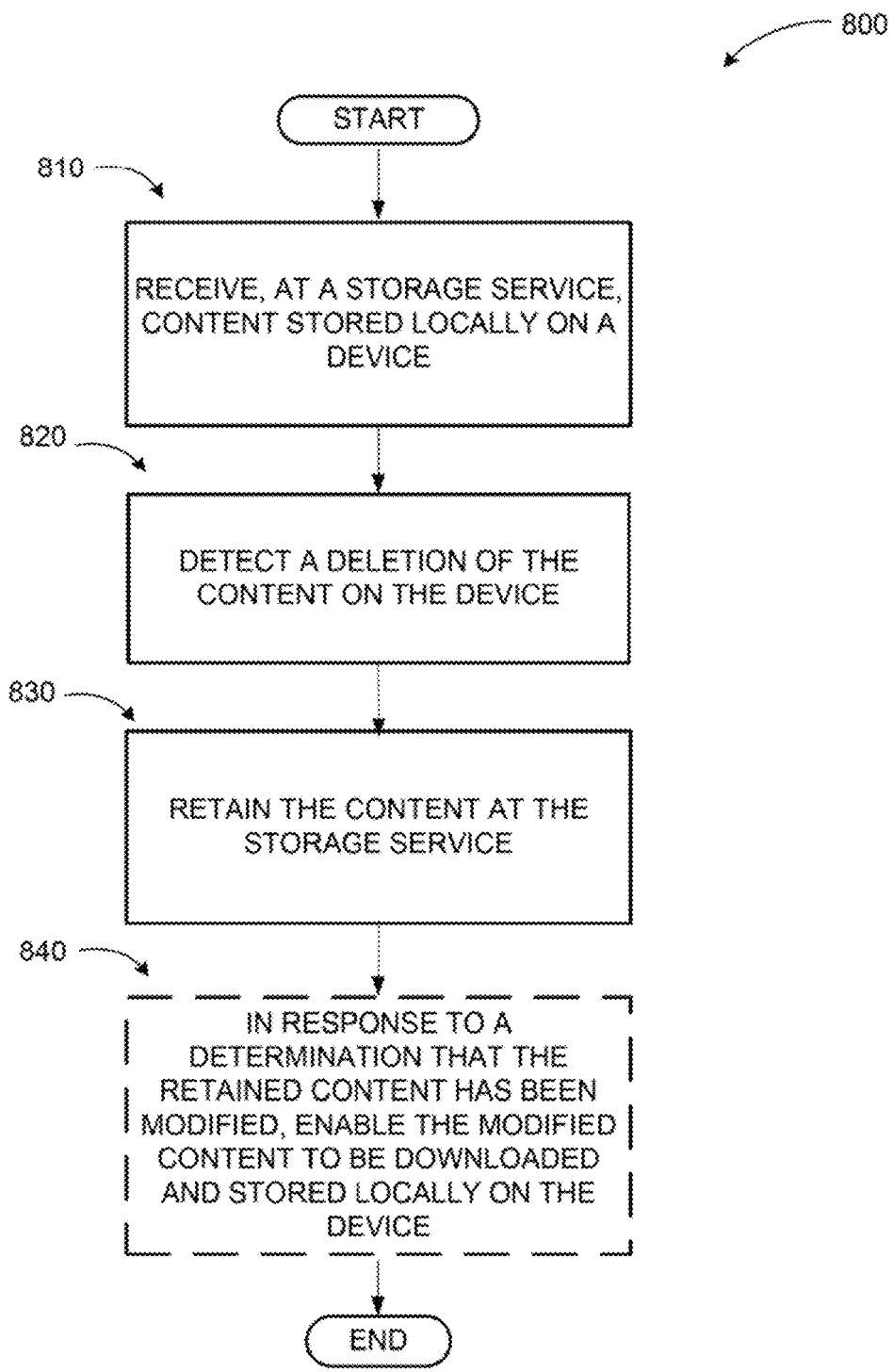
FIG. 8 illustrates a logic flow diagram of a method to retain locally deleted content at a storage service.

FIG. 8 illustrates a logic flow diagram of a method to retain locally deleted content at a storage service, according to embodiments.

Process 800 may be implemented on a computing device, server, or other system. An example system may include a server comprising a communication interface to facilitate communication between a storage service and one or more devices, a memory, and one or more processors. The processors may be configured to, in conjunction with the memory, execute a storage service provided to enable storage and/or sharing of content across multiple devices and users. The storage service may also be configured to retain locally deleted content to prevent accidental or nefarious deletions of content stored locally on a device from causing the content to be deleted universally across the storage service and/or other devices.

Process 800 begins with operation 810, where the storage service may receive content stored locally on a device. Periodic synchronization between the content stored locally on the device and the content stored remotely at the storage service may be performed through a synchronization client executing on the device, for example, to ensure a most updated version of the content is stored and/or shared at each location. In some embodiments, a selectable feature of the device and/or a feature of a folder containing the content may be retainment of the content at the storage service. For example, a user of the device or administrator may select for deleted content from the device or folder to only be removed from the device, and not from the storage service. This feature selection may cause the storage service to tag the device or the folder as a local deletes only device or a local deletes only folder, respectively. In further examples, the user or administrator may also be enabled to select an option to configure the device as a master device such that the content is not retained the storage service when the deletion of the content occurs through the master device. At operation 820, the storage service may detect a deletion of the content on the device.

At operation 830, the storage service may retain the content at the storage service. In one embodiment, the storage service may automatically retain the content at the storage service after identifying the device and/or folder as being tagged as local deletes only at the storage service. In another embodiment, the user or administrator may not have selected to retain locally deleted content at the storage service as a feature of the device and/or folder, and thus the device and/or the folder may not be tagged as a local deletes only at the storage service. Therefore, the storage service may provide deletion options to the user in response to detecting the deletion of the content on the device. The deletion options may be provided to the user through a user interface of the synchronization client in response, and may include deleting the content from the local storage of the device, deleting the content stored locally on other devices associated with the user, and deleting the content stored remotely at the storage service. The storage service may retain the content based on the selected deletion options. Alternatively, the storage service may retain the content based on another configuration of the device. For example, if the device on which the content deletion is detected is configured as a master device, the content may not be retained at the storage service. Once the content is retained, the storage service may prevent the retained content from being downloaded and stored locally on the device when content at the storage service and the device are synchronized.

At operation 840, in response to a determination that the retained content has been modified, the storage service may optionally enable the modified content to be downloaded and stored locally on the device when content at the storage service and the device are synchronized.

The operations included in process 800 are for illustration purposes. Retainment of locally deleted content may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

Figure 9:
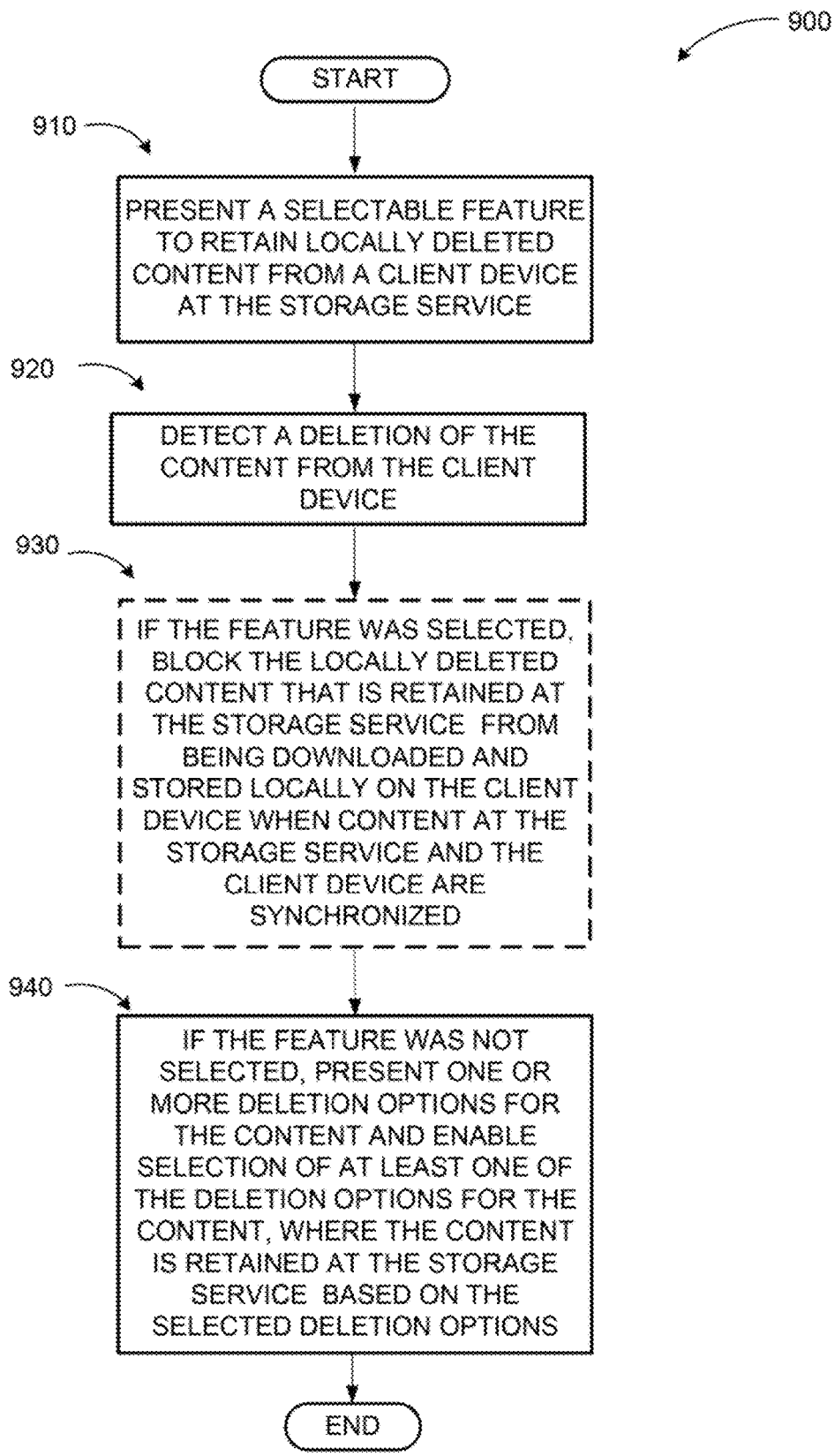
FIG. 9 illustrates a logic flow diagram of a method to select to retain locally deleted content at a storage service, according to embodiments.

FIG. 9 illustrates a logic flow diagram of a method to select to retain locally deleted content at a storage service, according to embodiments.

Process 900 may be implemented on a computing device, server, or other system. An example system may include a client device associated with a user. The client device may comprise a display, a communication interface to facilitate communication between the client device and a storage service, a memory, and one or more processors. The processors may be configured to, in conjunction with the memory, enable the user to select to retain locally deleted content at the storage service to prevent accidental or nefarious deletions of locally stored content from causing the content to be deleted universally.

Process 900 begins with operation 910, where the processors may present a selectable feature to retain locally deleted content from the client device at the storage service through the display. For example, a selectable feature of the client device and/or a selectable feature of a folder containing the content may be presented to the user. At operation 920, a deletion of the content from the client device may be detected.

In response to detecting the deletion, either operation 930 or operation 940 may be executed based on whether the feature to retain locally deleted content from the client device at the storage service was selected. At operation 930, if the feature to retain locally deleted content from the client device at the storage service was selected, the processors may optionally block the locally deleted content that is now retained at the storage service from being downloaded and stored locally on the client device when content at the storage service and the client device are synchronized.

At operation 940, if the feature to retain locally deleted content from the client device at the storage service was not selected, the processors may present one or more deletion options for the content through the display, and enable selection of at least one of the deletion options for the content. The content may be retained at the storage service based on the selected deletion options The operations included in process 900 are for illustration purposes. Enabling a selection to retain locally deleted content at a storage service may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some embodiments, a means to retain locally deleted content at a storage service may be provided, including a means to receive content stored locally on a device, a means to provide to be displayed a selectable feature to retain locally deleted content at the storage service, where the selectable feature is a selectable feature of one or more of the device and a folder containing the content, and a means to associate the one or more of the device and the folder with a local deletes only tag at the storage service in response to detecting a selection of the feature. The means may further include a means to detect a deletion of the content on the device, and a means to automatically retain the content at the storage service based on identification of the local deletes only tag associated with the one or more of the device and the folder.

According to some examples, methods to retain locally deleted content at a storage service are provided. An example method may include receiving content stored locally on a device, providing to be displayed a selectable feature to retain locally deleted content at the storage service, where the selectable feature is a selectable feature of one or more of the device and a folder containing the content, and associating the one or more of the device and the folder with a local deletes only tag at the storage service in response to detecting a selection of the feature. The method may further include detecting a deletion of the content on the device, and a automatically retaining the content at the storage service based on identification of the local deletes only tag associated with the one or more of the device and the folder.

In other examples, if the feature is not selected and the deletion of the content on the device is detected, deletion options for the content may be provided to be displayed. The content may be retained at the storage service based on the deletion options selected. The deletion options include deleting the content stored locally on the device, deleting the content stored locally on other devices associated with the user, and/or deleting the content stored remotely at the storage service.

In further examples, the retained content may be prevented from being downloaded and stored locally on the device when content at the storage service and the device are synchronized. In response to a determination that the retained content has been modified, the modified content may be enabled to be downloaded and stored locally on the device when content at the storage service and the device are synchronized. A user may be enabled to configure the device as a master device. In response to detecting a deletion of content stored locally on the master device, the content may be automatically deleted at the storage service.

According to other embodiments, servers to execute a storage service configured to retain locally deleted content at the storage service may be described. An example server may include a communication interface configured to facilitate communication between the storage service and a device, a memory configured to store instructions, and one or more processors coupled to the memory. The processors, in conjunction with the instructions stored in the memory, may be configured to receive, at the storage service, content stored locally on the device and provide to be displayed a selectable feature to retain locally deleted content at the storage service, where the selectable feature may be a selectable feature of one or more of the device and a folder containing the content, and associate the device and/or the folder with a local deletes only tag at the storage service in response to detecting a selection of the feature. The processors may be further configured to detect a deletion of the content on the device, and automatically retain the content at the storage service based on identification of the local deletes only tag associated with the device and/or the folder.

In other embodiments, in response to a determination that the feature is not selected, deletion options for the content may be provided to be displayed, where the content may be retained at the storage service based on the deletion options selected. A version of the content may be tracked when the device and/or the folder are tagged. An option to enable a modified version of the content to be downloaded and stored locally on the device when content at the storage service and the device are synchronized may be provided to be displayed.

According to some examples, computer readable memory devices with instructions stored thereon to retain locally deleted content at a storage service may be described. Example instructions may include receiving content stored locally on a device, providing to be displayed a selectable feature to retain locally deleted content at the storage service, where the selectable feature is a selectable feature of one or more of the device and a folder containing the content; and detecting a deletion of the content on the device. If the feature was selected, the instructions may include automatically retaining the content at the storage service based on identification of a local deletes only tag that was associated with the one or more of the device and the folder in response to a detection of the selection of the feature. If the feature was not selected, the instructions may include providing to be displayed deletion options for the content; and retaining the content at the storage service based on one or more of the deletion options selected.

In other examples, deletion options may include deletion of the content stored locally on the device associated with a user, deletion of the content stored locally on other devices associated with the user, and deletion of the content stored remotely at the storage service. An option to configure the client device as a master device may be provided to be displayed, and the content may be automatically deleted at the storage service in response to detecting a deletion of content stored locally on the master device. The retained content may be prevented from being downloaded and stored locally on the device when content at the storage service and the device are synchronized. An option to enable a modified version of the content to be downloaded and stored locally on the device when content at the storage service and the device are synchronized may be provided to be displayed.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to retain locally deleted content at a cloud-based storage service, the method comprising:
   receiving content stored locally on a client device;
   providing to be displayed on the client device a selectable feature to retain locally deleted content from the client device at the cloud-based storage service;
   providing to be displayed an option to configure the client device as a master device:
   in response to detecting a selection of the feature, associating the client device with a local deletes only tag at the cloud-based storage service;
   detecting a deletion of the content on the client device;
   automatically retaining the content at the storage service based on identification of the local deletes only tag associated with the client device;
   blocking an automatic download of the retained content from the cloud-based storage service to the client device in response to detecting a content synchronization between the cloud-based storage service and the client device; and
   when the client device is configured as the master device, in response to detecting a deletion of content stored locally on the client device, automatically deleting the content at the cloud-based storage service.

2. The method of claim 1, further comprising:
   when the feature is not selected and the deletion of the content on the client device is detected, providing to be displayed deletion options for the content.

3. The method of claim 2, further comprising:
   retaining the content at the cloud-based storage service based on one or more of the deletion options selected.

4. The method of claim 2, wherein one of the deletion options includes deleting the content stored locally on the client device.

5. The method of claim 2, wherein one of the deletion options includes deleting the content stored locally on other client devices associated with a user of the client device.

6. The method of claim 2, wherein one of the deletion options includes deleting the content stored remotely at the cloud-based storage service.

7. The method of claim 1, further comprising:
   in response to a determination that the retained content has been modified, enabling the modified content to be downloaded and stored locally on the client device when content at the cloud-based storage service and the client device are synchronized.

8. A server to execute a cloud-based storage service configured to retain locally deleted content at the cloud-based storage service, the server comprising:
   a communication interface configured to facilitate communication between the cloud-based storage service and a client device;
   a memory configured to store instructions; and
   one or more processors coupled to the memory, the one or more processors, in conjunction with the instructions stored in the memory, are configured to:
      receive, at the cloud-based storage service, content stored locally on the client device;
      provide to be displayed on the client device a selectable feature to retain locally deleted content from the client device at the cloud-based storage service, wherein the selectable feature is a selectable feature of one or more of the client device and a folder containing the content;
      enable a user to configure the client device as a master device;
      in response to detecting a selection of the feature, associate the one or more of the client device and the folder with a local deletes only tag at the cloud-based storage service;
      detect a deletion of the content on the client device;
      automatically retain the content at the cloud-based storage service based on identification of the local deletes only tag associated with the one or more of the client device and the folder; and
      block an automatic download of the retained content from the cloud-based storage service to the client device in response to detecting a content synchronization between the cloud-based storage service and the client device;

in response to a determination that the feature is not selected, provide to be displayed on the client device deletion options for the content; and retain the content at the storage service based on one or more of the deletion options selected; and when the client device is configured as the master device, in response to detecting a deletion of content stored locally on the client device, automatically deleting the content at the cloud-based storage service.

9. The server of claim 8, wherein the one or more processors are further configured to:

track a version of the content when the one or more of the client device and the folder was tagged.

10. The server of claim 9, wherein the one or more processors are further configured to:

provide to be displayed on the client device an option to enable a modified version of the content to be downloaded and stored locally on the device when content at the cloud-based storage service and the client device are synchronized.

11. A non-transitory computer readable memory device with instructions stored thereon to retain locally deleted content at a storage service, the instructions comprising:

receiving content stored locally on a client device;

providing to be displayed on the client device a selectable feature to retain locally deleted content at the storage service, wherein the selectable feature is a selectable feature of a folder containing the content;

providing to be displayed an option to configure the client device as a master device;

detecting a deletion of the content on the client device; and when the feature was selected:

automatically retaining the content at the storage service based on identification of a local deletes only tag that was associated with the folder in response to a detection of the selection of the feature; and blocking an automatic download of the retained content from the storage service to the client device in response to detecting a content synchronization between the storage service and the client device;

when the feature was not selected:

providing to be displayed on the client device deletion options for the content; and retaining the content at the storage service based on one or more of the deletion options selected; and when the client device is configured as the master device, in response to detecting a deletion of content stored locally on the master device, automatically deleting the content at the storage service.

12. The non-transitory computer readable memory device of claim 11, wherein the one or more deletion options include deletion of the content stored locally on the client device associated with a user, deletion of the content stored locally on other client devices associated with the user, and deletion of the content stored remotely at the cloud-based storage service.

13. The non-transitory computer readable memory device of claim 11, wherein the instructions further comprise:

providing to be displayed an option to enable a modified version of the content to be downloaded and stored locally on the device when content at the cloud-based storage service and the client device are synchronized.

* * * * *